(12) United States Patent
Hansen

(10) Patent No.: US 11,209,094 B2
(45) Date of Patent: Dec. 28, 2021

(54) SEALED SPRINKLER VALVE BOX

(71) Applicant: Kevin Ray Hansen, St. George, UT (US)

(72) Inventor: Kevin Ray Hansen, St. George, UT (US)

( * ) Notice: Subject to any disclaimer, the term of this patent is extended or adjusted under 35 U.S.C. 154(b) by 0 days.

(21) Appl. No.: 16/886,672

(22) Filed: May 28, 2020

(65) Prior Publication Data

US 2020/0378514 A1   Dec. 3, 2020

Related U.S. Application Data

(60) Provisional application No. 62/853,566, filed on May 28, 2019.

(51) Int. Cl.
| | |
|---|---|
| *F16K 27/12* | (2006.01) |
| *A01G 25/00* | (2006.01) |
| *F16K 35/06* | (2006.01) |
| *B65D 45/02* | (2006.01) |
| *E03B 7/09* | (2006.01) |

(52) U.S. Cl.
CPC ............. *F16K 27/12* (2013.01); *A01G 25/00* (2013.01); *B65D 45/02* (2013.01); *E03B 7/095* (2013.01); *F16K 35/06* (2013.01); *Y10T 137/7021* (2015.04)

(58) Field of Classification Search
CPC ........ A01G 25/00; A01G 25/16; B65D 15/24; B65D 45/02; B65D 90/08; E03B 7/095; F16K 27/12; F16K 35/06; Y10T 137/6991; Y10T 137/6995; Y10T 137/7021; Y10T 137/7025; Y10T 137/7043; Y10T 137/7062

USPC ............... 137/343, 363, 364, 371, 372, 382; 220/4.03, 315, 327, 328, 484, 677, 682, 220/691, 323, 325, 692, 693; 239/200-207

See application file for complete search history.

(56) References Cited

U.S. PATENT DOCUMENTS

| | | | | |
|---|---|---|---|---|
| 154,408 | A | * | 8/1874 | McKnight ................ E03B 9/06 137/371 |
| 1,204,464 | A | * | 11/1916 | Lofton ..................... E03B 9/10 137/371 |
| 1,265,053 | A | * | 5/1918 | Clark ....................... E03B 9/10 137/371 |
| 1,639,661 | A | * | 8/1927 | Newcomb .............. B65D 55/14 292/251 |
| 1,760,888 | A | * | 6/1930 | Shield .................... B65D 25/32 292/4 |

(Continued)

*Primary Examiner* — Kevin F Murphy
*Assistant Examiner* — Jonathan J Waddy
(74) *Attorney, Agent, or Firm* — Gurr Brande & Spendlove, PLLC; Robert A. Gurr

(57) ABSTRACT

A sprinkler valve box has a housing, the housing having a base and sidewalls with a sealable lid thereon. The sidewalls may have one or more connecting ports therethrough. The housing has one or more pre-configured valves therein. The valves may be coupled to the one or more connecting ports in the sidewalls. The sidewalls are ideally corrugated for added strength and the lid seats over the sidewalls of the valve box, which may be lockable. The sprinkler valve box may also have a battery and a control unit, wherein the control unit is powered by the battery and controls the valves of the manifold. The control unit may be controlled wirelessly by a user.

18 Claims, 16 Drawing Sheets

(56) References Cited

U.S. PATENT DOCUMENTS

| | | | | | |
|---|---|---|---|---|---|
| 3,739,589 | A | * | 6/1973 | Wolfe | B65D 90/08 |
| | | | | | 405/189 |
| 4,706,839 | A | * | 11/1987 | Spence | A61L 2/26 |
| | | | | | 206/438 |
| 4,874,105 | A | * | 10/1989 | Tetreault | E03F 5/02 |
| | | | | | 220/484 |
| 4,993,450 | A | * | 2/1991 | Dunn | F16L 59/161 |
| | | | | | 137/381 |
| 5,361,925 | A | * | 11/1994 | Wecke | F16B 5/10 |
| | | | | | 220/325 |
| 6,343,709 | B1 | * | 2/2002 | DeForrest | B65D 45/02 |
| | | | | | 220/327 |
| 7,004,677 | B1 | * | 2/2006 | Ericksen | A01G 25/162 |
| | | | | | 137/364 |
| 7,255,228 | B2 | * | 8/2007 | Kim | A45C 11/00 |
| | | | | | 206/305 |
| 7,547,051 | B2 | * | 6/2009 | Burke | G02B 6/4451 |
| | | | | | 220/327 |
| 7,619,878 | B1 | * | 11/2009 | Cook | G01D 4/02 |
| | | | | | 361/672 |
| 8,991,226 | B2 | * | 3/2015 | Daniels | E05B 35/008 |
| | | | | | 70/168 |
| 2011/0303675 | A1 | * | 12/2011 | Foster | E05B 35/008 |
| | | | | | 220/484 |
| 2015/0088322 | A1 | * | 3/2015 | Antel | A01G 25/06 |
| | | | | | 700/284 |
| 2015/0216133 | A1 | * | 8/2015 | Franchini | G05D 7/0688 |
| | | | | | 700/284 |
| 2018/0346229 | A1 | * | 12/2018 | Guerdrum | B65D 11/1826 |

* cited by examiner

SEALED SPRINKLER VALVE BOX

CROSS-REFERENCE TO RELATED APPLICATIONS

This application claims the benefit of U.S. Provisional Application Ser. No. 62/853,566, filed on May 28, 2019, which is incorporated herein by reference.

TECHNICAL FIELD

The present disclosure relates to an in-ground sprinkler valve box. More particularly, the present disclosure relates to an enclosed and sealable in-ground sprinkler valve box.

BACKGROUND

At present, buried utility and service boxes are unsealed, tapered, open-bottomed, boxes with unsealed lids. Because they are unsealed, over time, the traditional, industry standard, boxes become an unfit environment for housing valves and wiring devices. Valves, solenoids, wiring, controllers, restrictors and filters placed in such an environment become trapped in silt, runoff water, and debris. Any underground dwelling creature, from snakes to spiders, moles to mice, scorpions to silverfish, all come to realize that a valve box is their "cave of wonders." This makes the valve box unsafe for a user or worker needing to adjust valves or do a repair within the box. Accordingly, there is a need for a valve box that reduces or prohibits the ability of spiders, bugs, rodents, snakes and other creatures from inhabiting the box.

Additionally, valve boxes in the industry do not have a bottom. As a result, the box becomes unstable and sinks with every pressure placed upon it. In many instances, this results in dirt, rocks, and other debris not only covering the box (making it difficult to find), but also makes the valves within the box difficult to access as they tend to become buried as well. Accordingly, there is a need for a valve box that prohibits or prevents sinking.

Lastly, there is a need for a valve box that is easy to assemble and install, and that allows a worker to quickly assemble the valves, increasing efficiency.

The sprinkler valve box disclosed herein solves these and other problems.

SUMMARY OF EXAMPLE EMBODIMENTS

In one embodiment, a sprinkler valve box comprises a housing, the housing having a base and sidewalls with a sealable lid thereon, the sidewalls having one or more connecting ports therethrough. In one embodiment, the housing comprises one or more pre-configured valves therein (collectively referred to as a manifold), the valves coupled to the one or more connecting ports in the sidewalls. In one embodiment, the sidewalls are corrugated for added strength. In one embodiment, the lid seats over the sidewalls of the valve box. In one embodiment, the lid comprises a locking mechanism.

In one embodiment, a sprinkler valve box comprises a preconfigured unibody manifold, a battery, and a control unit, wherein the control unit is powered by the battery and controls the valves. In one embodiment, the control unit comprises a microcontroller and a wireless transceiver. In one embodiment, a user may control the manifold remotely via a wireless connection to the control unit.

In one embodiment, a sprinkler valve box comprises an extender and a housing. The housing having a base and sidewalls with a sealable lid thereon, the sidewalls having one or more connecting ports therethrough. In one embodiment, the housing comprises one or more pre-configured valves therein (collectively referred to as a manifold), the valves coupled to the one or more connecting ports in the sidewalls. The sidewalls may be ribbed for added strength. Further, the lid seats over the sidewalls of the valve box and is secured via a locking mechanism.

DETAILED DESCRIPTION OF EXAMPLE EMBODIMENTS

Figure 1:
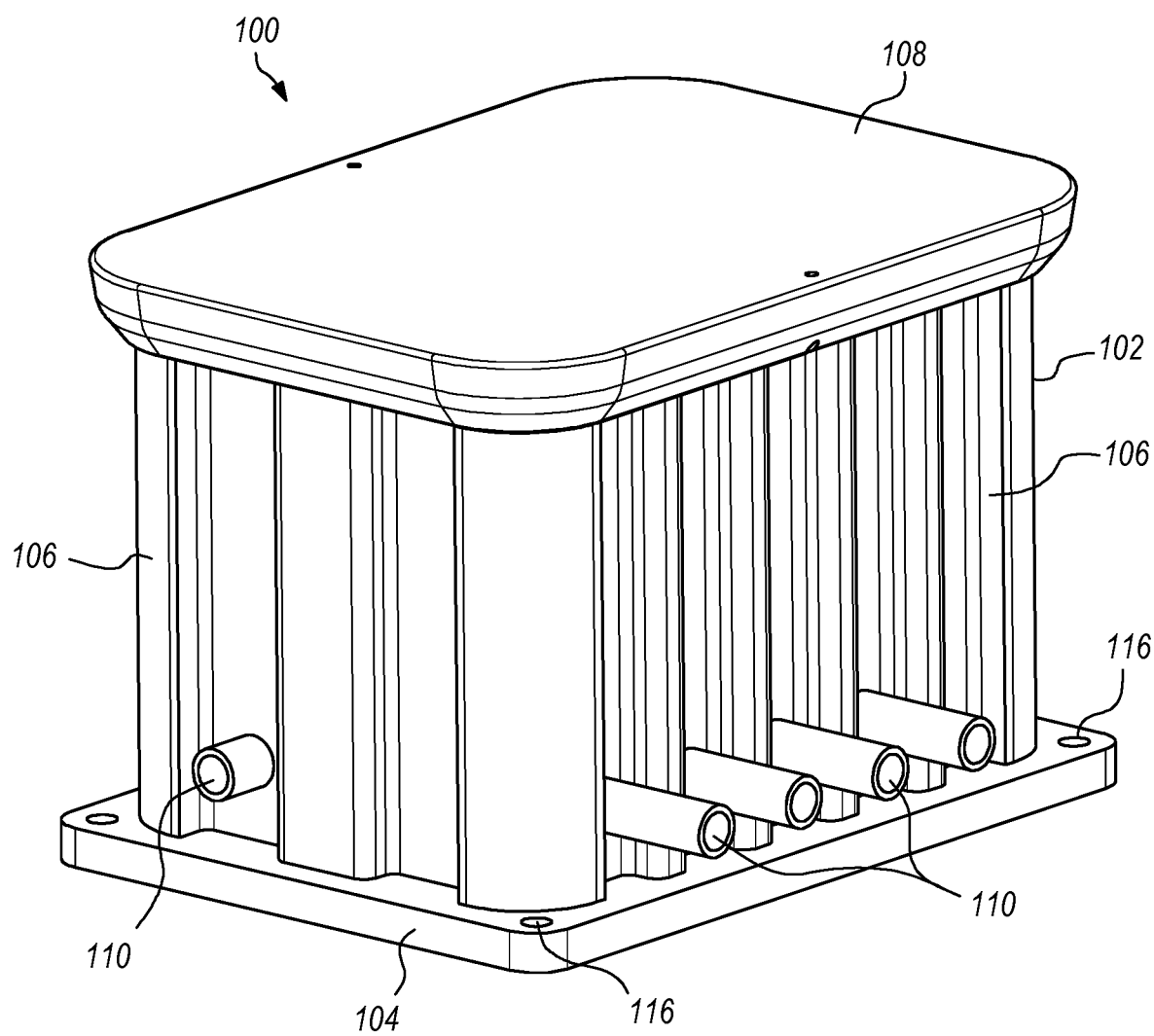
FIG. 1 illustrates a top, front perspective view of a sprinkler valve box.
Figure 2:
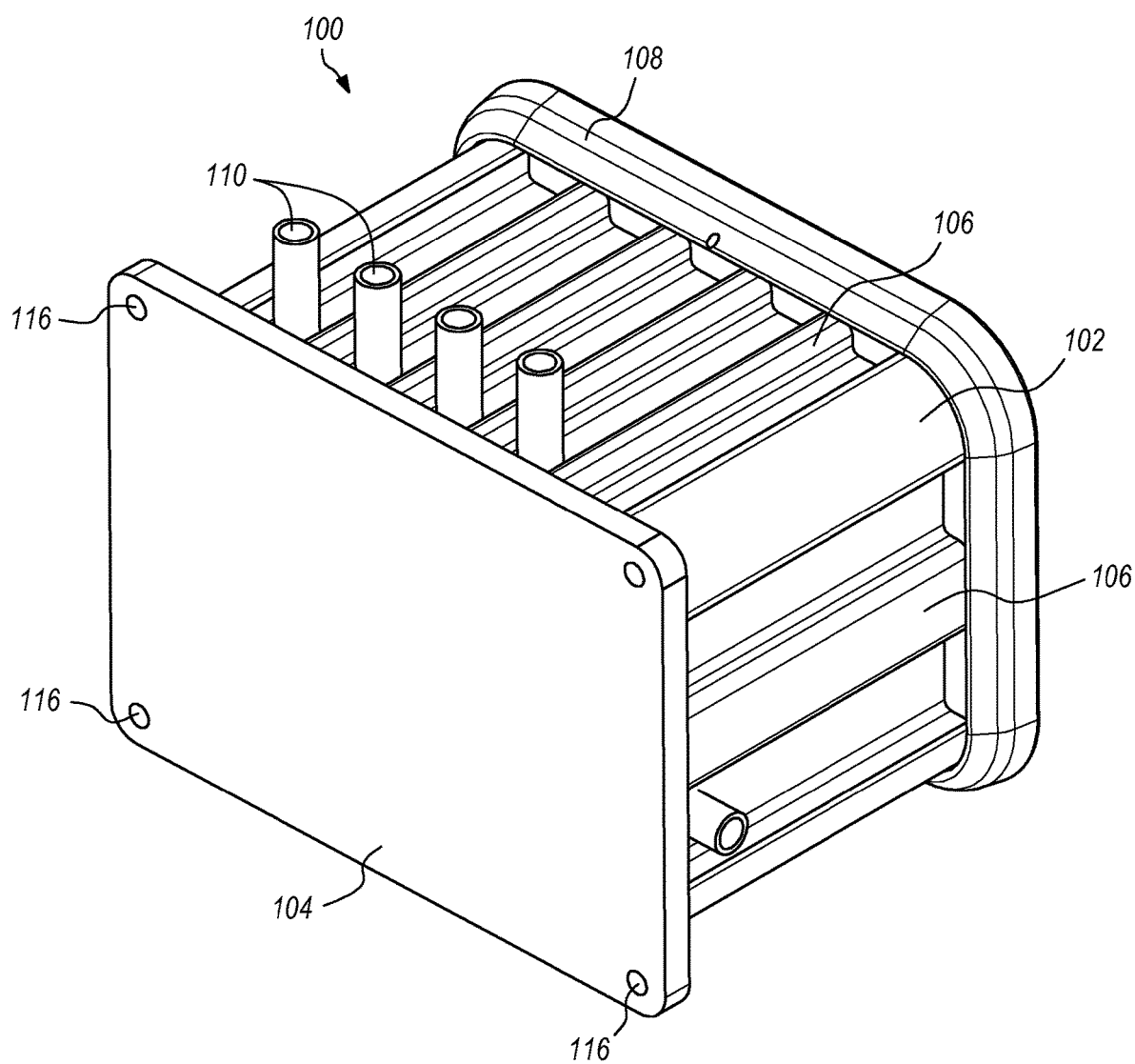
FIG. 2 illustrates a bottom, front perspective view of a sprinkler valve box.
Figure 3:
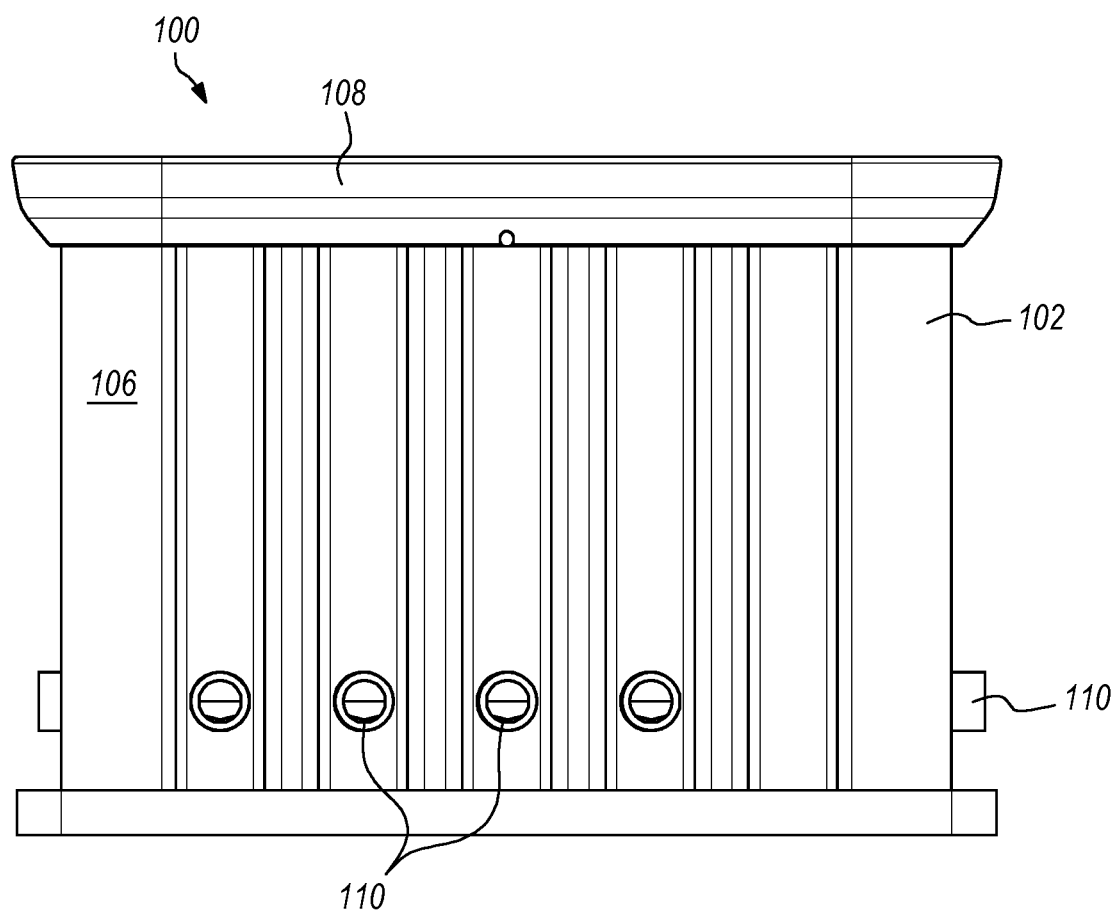
FIG. 3 illustrates a front elevation view of a sprinkler valve box.
Figure 4:
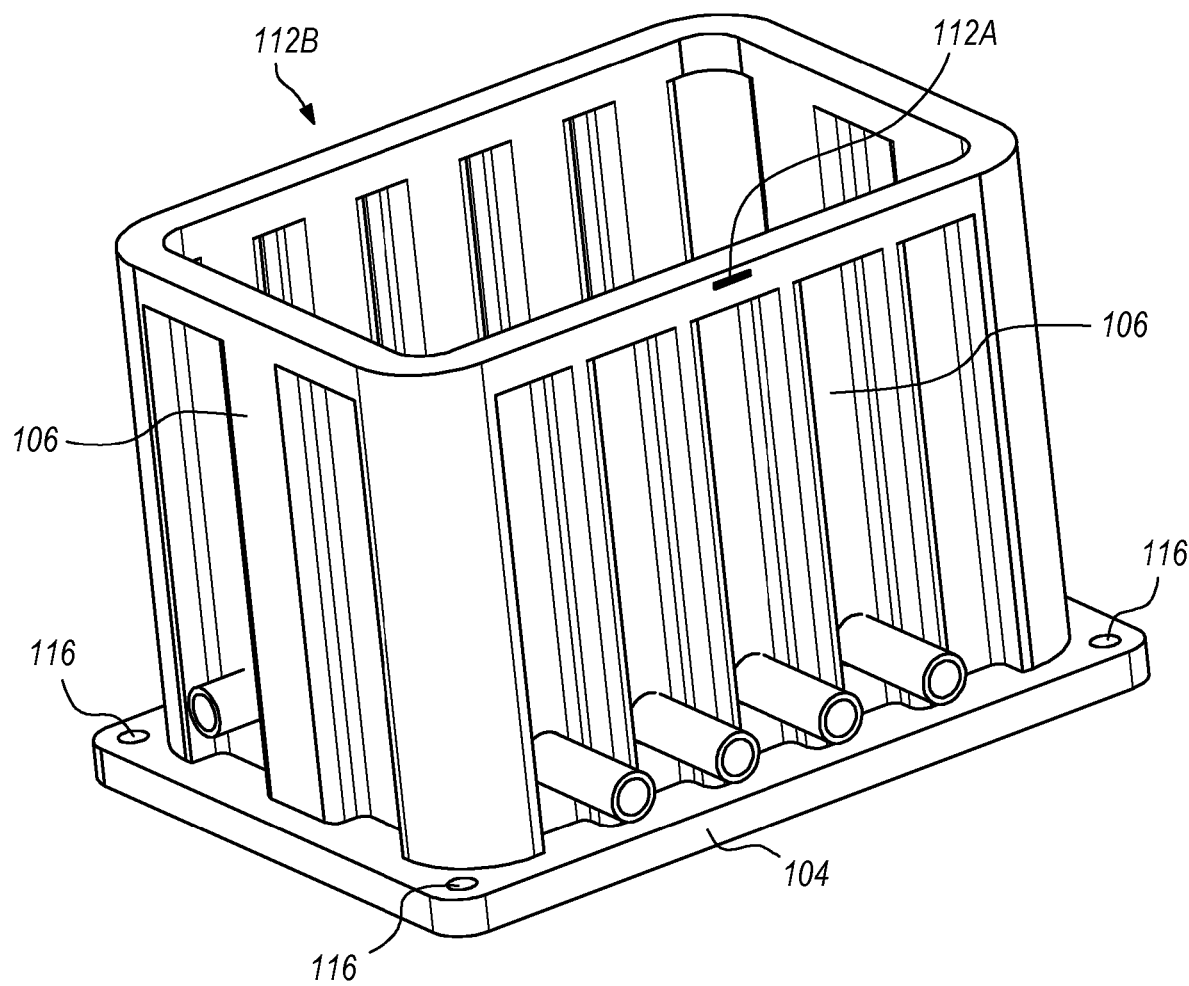
FIG. 4 illustrates a top, front perspective view of a sprinkler valve box with the lid removed.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.). Further, while sprinkler valves and manifolds are used throughout, it will be appreciated that these are examples only and that the sealed valve box could be used for other uses, including other electronics, concealing valuables, or any other number of uses.

As previously discussed, there is a need for a valve box that reduces or prohibits the ability of spiders, bugs, rodents, snakes and other creatures from inhabiting the box, that prohibits or prevents sinking, and that is easy to assemble and install, and that allows a worker to quickly install sprinkling systems, increasing efficiency. As will be appreciated from the below disclosure, the valve box disclosed herein solves these needs and others.

Figure 5:
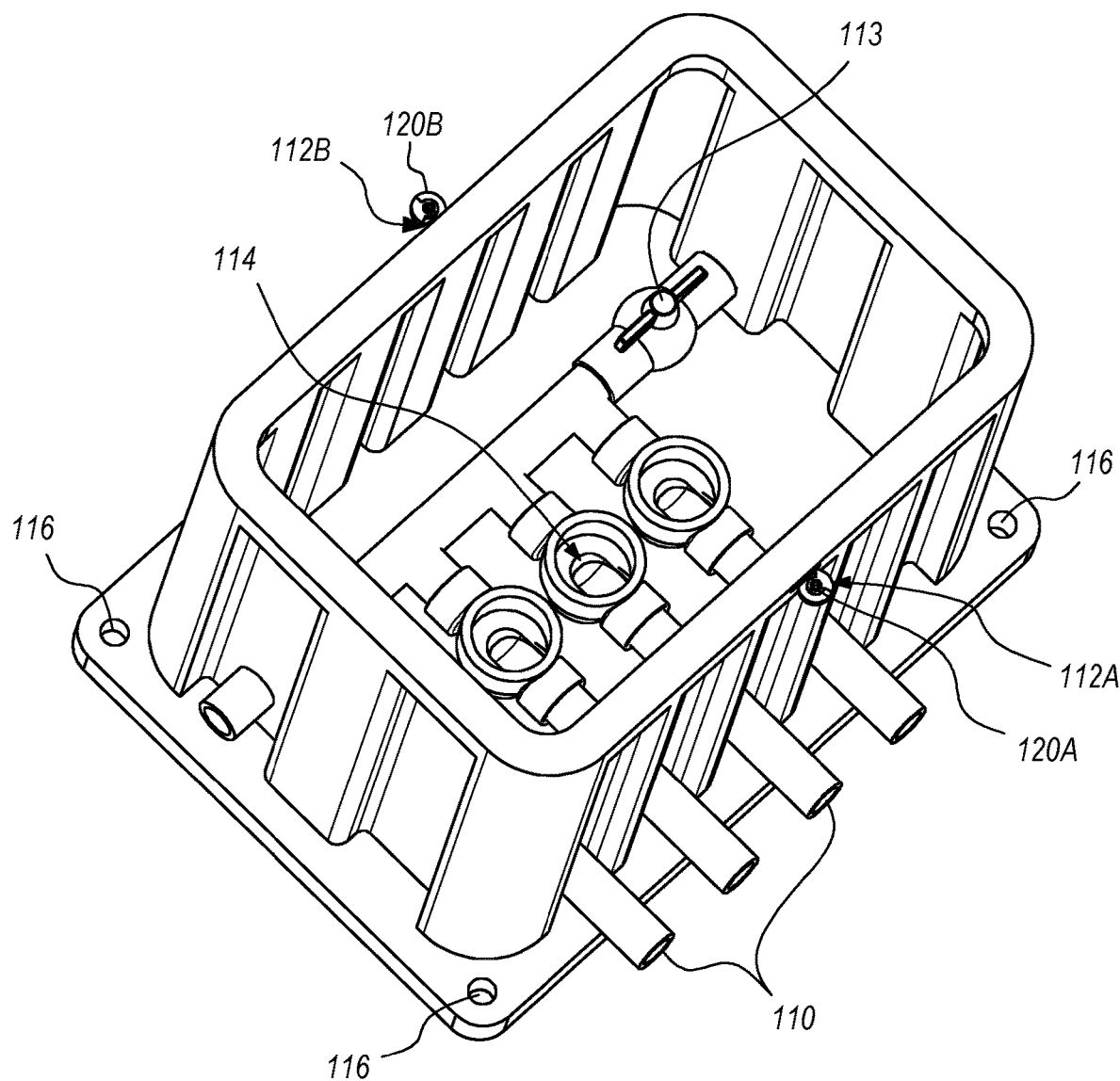
FIG. 5 illustrates is a top perspective view of a sprinkler valve box with the lid removed, showing the manifold therein.

In one embodiment, as shown generally in FIGS. 1-5, a sprinkler valve box 100 comprises a housing 102, the housing 102 having a base 104 and sidewalls 106 with a sealable lid 108 thereon. The housing 102 may be rectangular, as shown. However, the housing may be any shape, such as rectangular, square, circular, etc. The sidewalls 106 may have one or more connecting ports 110 therethrough and locking channels 112A, 112B therein. The connecting ports 110 may function as inlets/outlets of water, allowing for easy connection. In other words, a user may simply connect one or more sprinkler lines to the outgoing connecting port(s) 110. Referring to FIG. 5, in one embodiment, the housing 102 comprises one or more pre-configured valves 114 therein (collectively referred to as a manifold), the valves 114 coupled to the one or more connecting ports 110 in the sidewalls 106. It will be appreciated that the manifold may be a unibody manifold. In some embodiment, the manifold may be a monolithic manifold. This allows for quick and easy assembly of a sprinkler system. For example, a user may simply place the valve box 100 at the desired location (e.g., in a hole in the ground). The user may then easily connect incoming and outgoing water lines to the outside of the valve box 100 via the connecting ports 110. This saves considerable time since the user does not have to construct the manifold. Further, it reduces the odds of error by the installer, as well as reduces joints that can become potential leak points. In addition, the sidewalls 106 may be corrugated, ribbed, or any other shape for added strength, reducing torsion and sidewall deflection. If the connection ports 110 are coupled to the sidewalls 106 on the inner channel of the corrugation or ribs, the connection ports 110 are more protected, particularly when excavating around the valve box 100, which reduces odds of breakage at the connection point. In an alternate embodiment, the sidewalls 106 are flat, without corrugations.

Because the valve box 100 comprises a base 104, the odds of it settling deeper into the ground are reduced, while the overhanging base reduces the pop-out effect when in a flooded environment. Further, it allows the valve box 100 to have the contents therein sealed. However, in one embodiment, the base 104 need not be solid and may contain one or more apertures. This may be beneficial to allow leaking water to seep into the ground below, rather than raise up in the valve box 100 where it can affect wiring or other components. The base 104 may have spike apertures 116 that allow the valve box 100 to be secured to the ground, which further reduces or eliminates movement of the valve box 100 once placed. In an alternate embodiment, the base 104 may have spikes integrated therein, allowing a user to simply push/force the base, with the spikes, into the ground.

Figure 6:
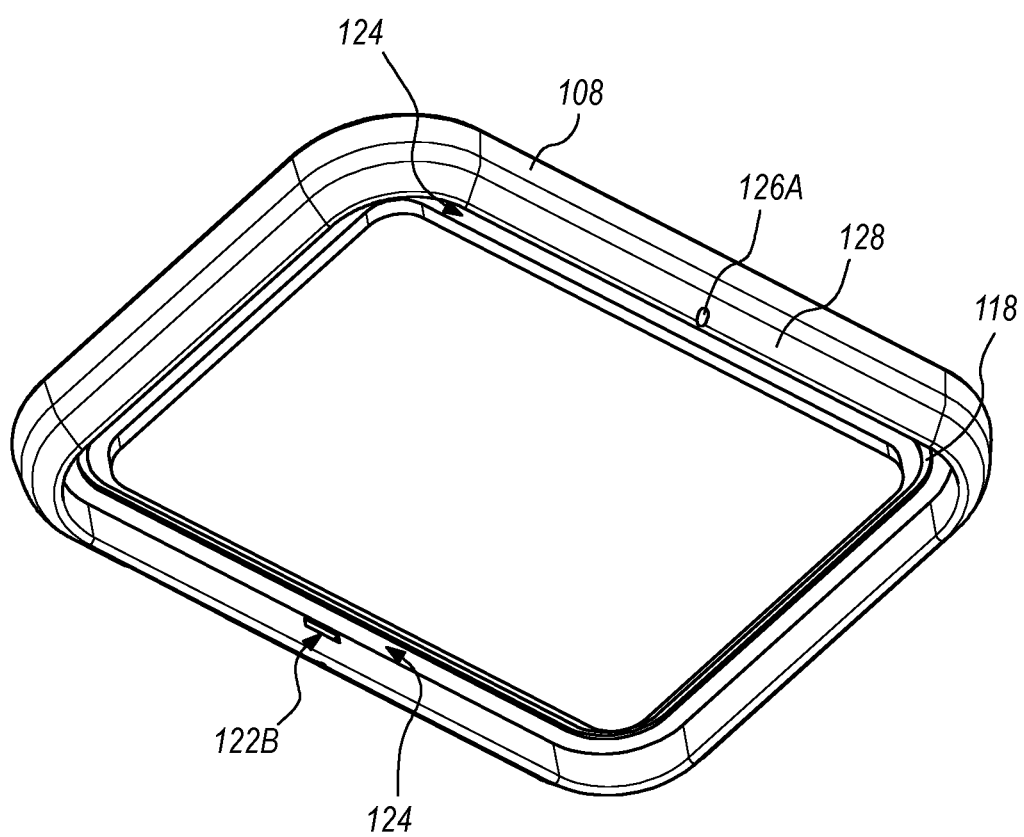
FIG. 6 illustrates a bottom perspective view of a lid of a sprinkler valve box.
Figure 7:
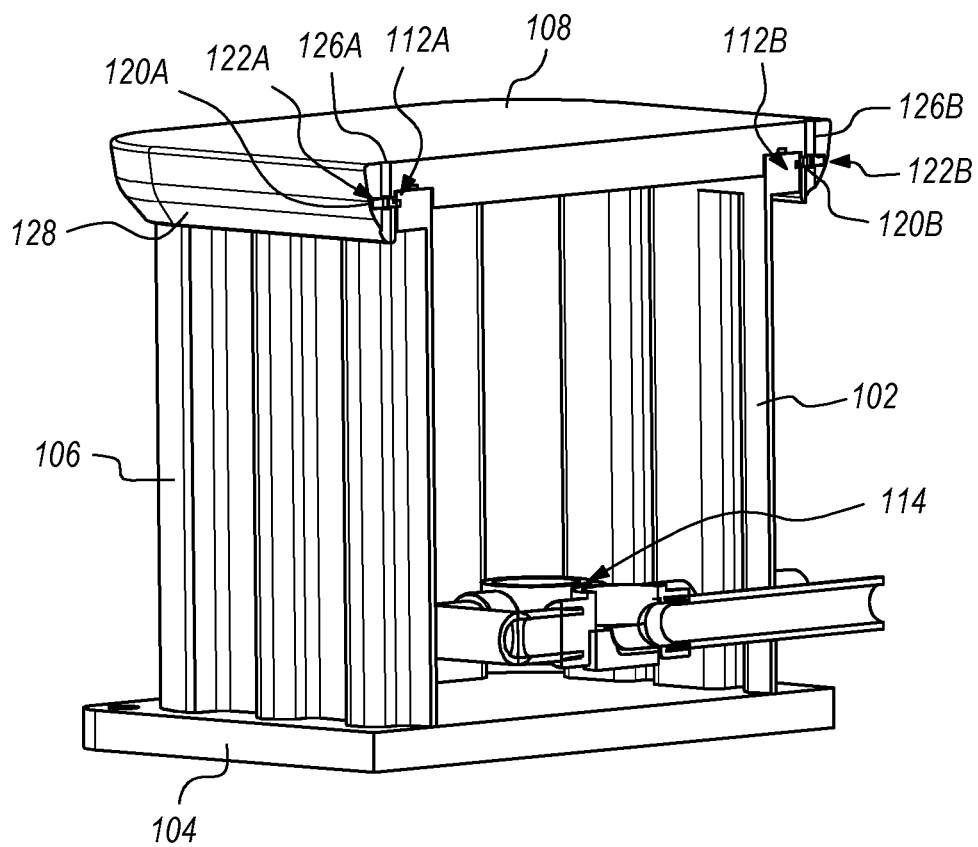
FIG. 7 illustrates a side, cross-section view of a sprinkler valve box.

As shown in FIGS. 6-7, the lid 108, in some embodiments, may comprise a water-tight seal, such as by using a rubber seal 118 (e.g., O-ring). This seal 118 keeps the contents of the valve box 100 free from dirt, debris, bugs, rodents, and other objects. Further, the lid 108 may also comprise a locking mechanism, such as camlocks 120A, 120B positioned in channels 122A, 122B on an inner surface 124 of the lid 108. While the camlocks 120A, 120B are shown, it will be appreciated that any other suitable locking mechanism may be used, such as levers, spring-loaded pins, cotter pins, bolts, etc. It will also be appreciated that while an O-ring 118 and a locking mechanism 120A, 120B are shown, the valve box 100 does not need to have an O-ring 118 or a locking mechanism 120A, 120B. In one embodiment, the valve box 100 may comprise an O-ring without a locking mechanism, or vice versa.

Figure 8:
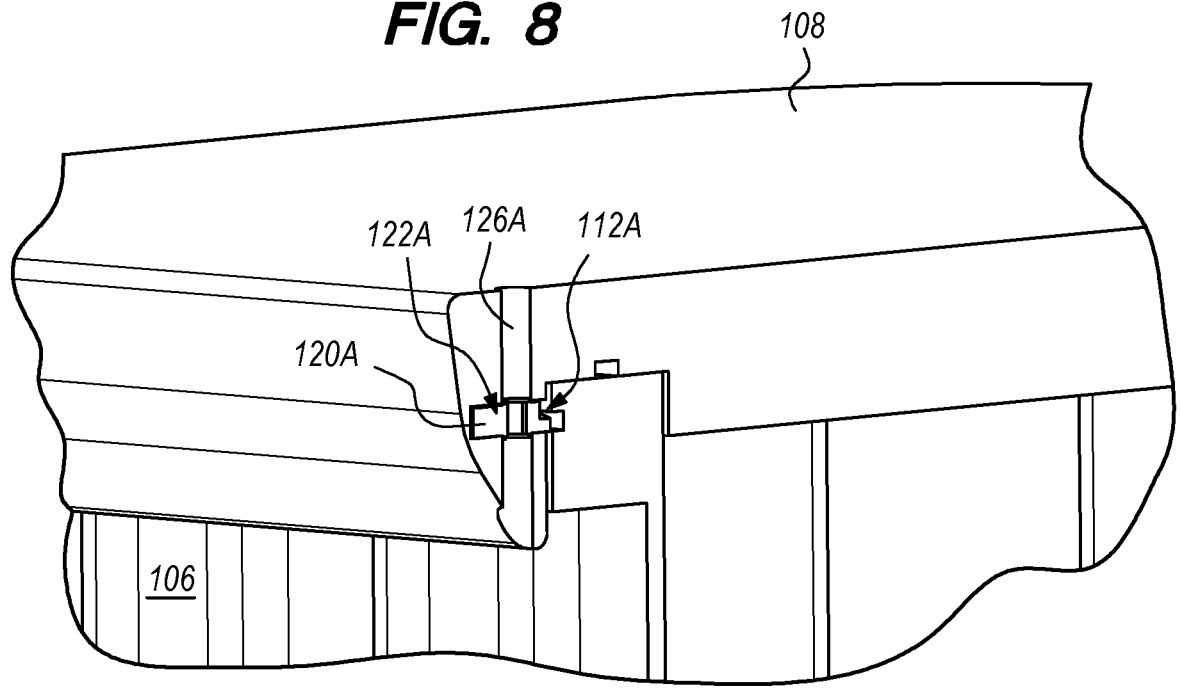
FIG. 8. illustrates a detailed, cross-section view of a cam-lock on the lid of a sprinkler valve box.
Figure 9:
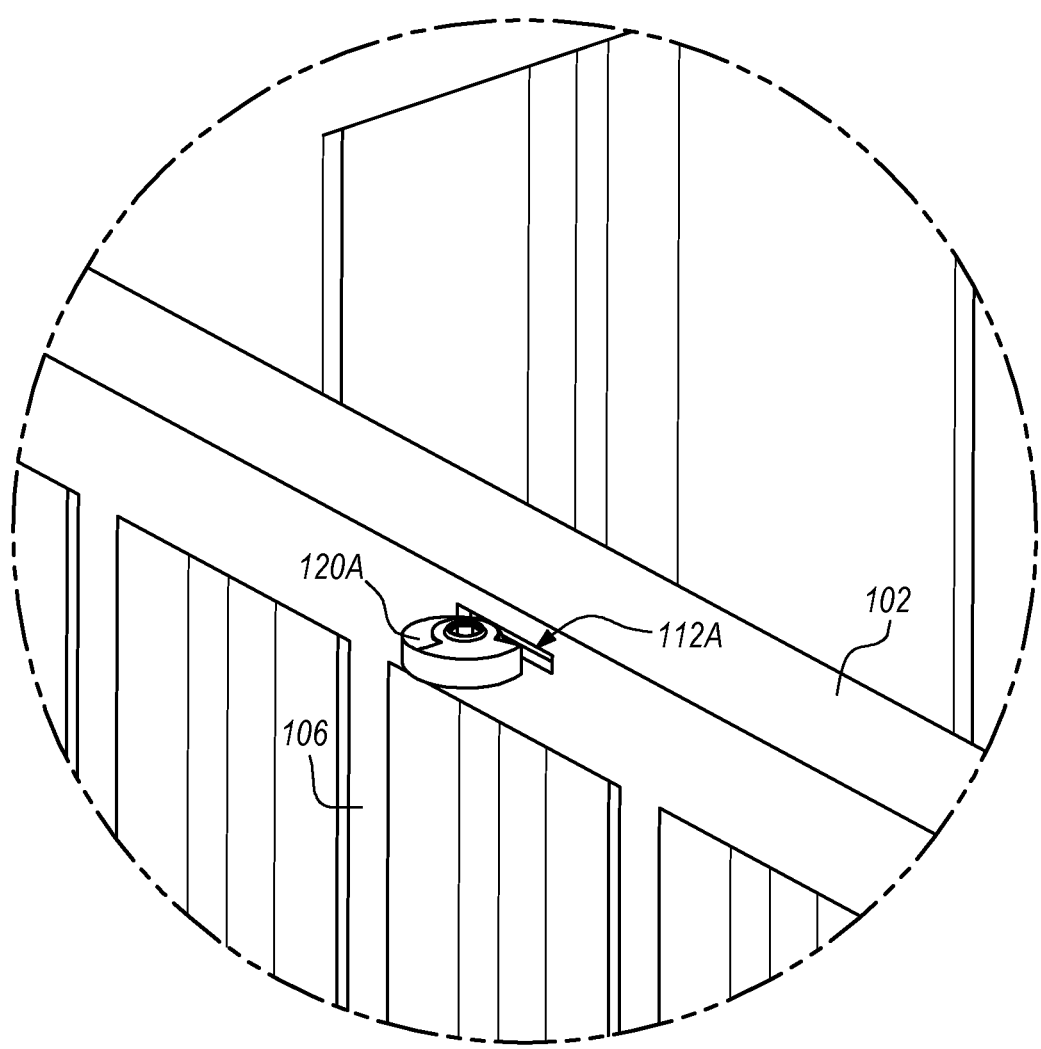
FIG. 9 illustrates a camlock inserted into a housing of a sprinkler valve box.

To actuate the camlocks 120A, 120B, a user may insert a key, such as an allen wrench, into the key apertures 126A, 126B, wherein the key may also aid in removal of the lid 108. The key may be a j-key. The key apertures 126A, 126B may pass through the lid 108, from a top to a bottom of the lid 108. Accordingly, the camlocks 120A, 120B would be accessible via two locations (shown in FIG. 8). As the user inserts the key into the key apertures 126A, 126B and into the camlock 120A, 120B, the user may turn the key to position the camlock 120A, 120B into the locking channels 112A, 112B positioned on the housing 102 so as to secure the lid 108 to the housing 102. More specifically, the camlock 120A, 120B increases in thickness around its circumference (shown in FIG. 9). When the camlock 120A, 120B is positioned in the locking channels 112A, 112B and turned, the depth or thickness of the camlock increases as it is turned, thereby securing the lid 108 to the housing 102 and creating a tighter seal.

A locking lid 108 has several benefits over the prior art: 1) aids in keeping the lid 108 secure to the housing 102, thereby keeping the contents sealed; 2) makes the box tamper resistant; 3) aids in removal when unlocked; and 4) reduces trip hazards. As appreciated, because the contents (e.g., manifold) of the valve box 100 are sealed, numerous benefits are realized. Additional benefits include a clean working environment, which allows a user to make changes and repairs significantly faster, allows for quick and easy detection of leaks (inside vs. outside, etc.), and allows for a plurality of uses (e.g., electrical connections, meters, other valves, etc.).

Further, referring back to FIGS. 6-7, the lid 108 may comprise a tapered edge 128. This allows the lid to be easily removed, aids in keeping debris away from the edge of the valve box 100 where the seal occurs, and allows for solid surface installation, such as in concrete or asphalt. Not only is removal of the lid 108 easier, but insertion of the lid 108 is easier with a tapered edge 128.

Additionally, the manifold may be pre-configured for any number of scenarios and numbers of valves. In one embodiment, the valve box 100 may further comprise a pressure reducer and filter. This allows for a single location for both the valves and the pressure reducer and allows them to both be maintained in a clean environment. The valve box 100 may further comprise a shutoff valve 113, isolating the valve box 100 from other components. In other words, a user needing to work on the manifold or connections thereto can simply shutoff the water to the valve box 100 without affecting any other water lines. Further, the valve box 100 may comprise a pressure relieving port, such as in the sidewall 106 or lid 108 which aids in preventing excess pressure build-up and may also aid in identifying a manifold leak. In one embodiment, the valve box 100 may comprise one or more hose bibs for easy hose connections.

Figure 10:
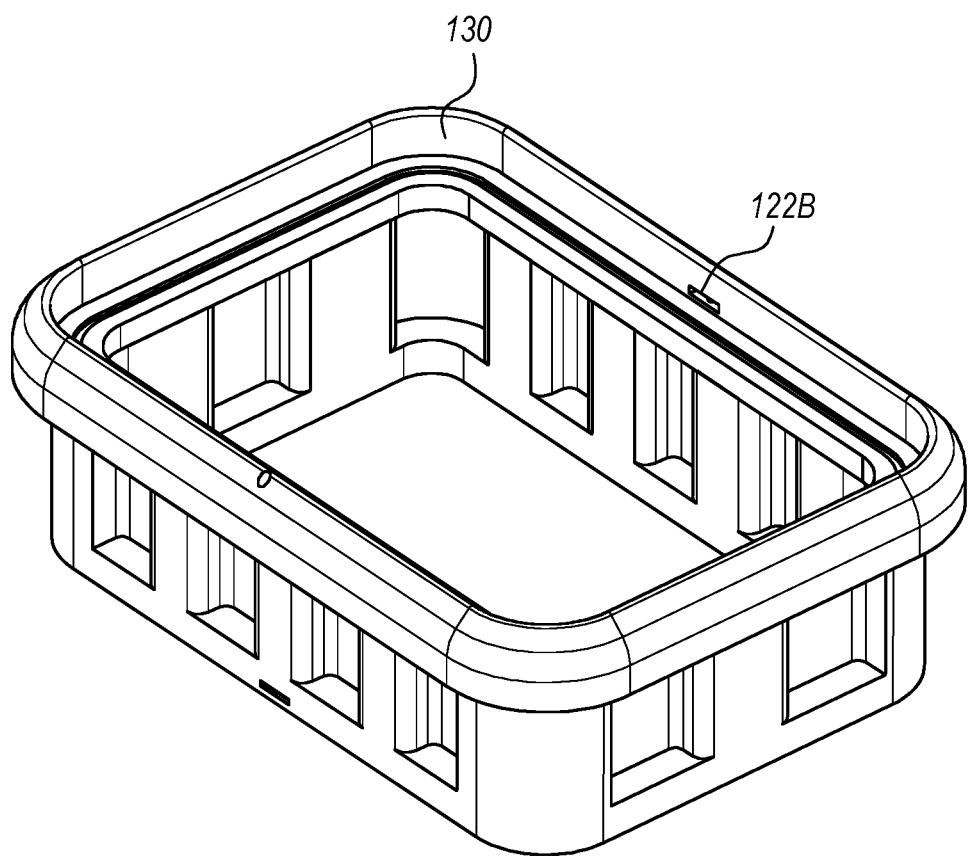
FIG. 10 illustrates a housing extender of a sprinkler valve box.

In one embodiment, shown in FIG. 10, the valve box 100 may comprise a housing extension 130. This extension 130 allows for desired placement without affecting accessibility. For example, if the piping is such that the valve box 100 must be placed low into the ground, an extension 130 may be used to bring the lid 108 level with the surface. Extension 130 may be in a variety of sizes, allowing a user to customize to their needs. Each extension 130 may couple to the sidewalls 106 or to a prior-coupled extension. In other words, multiple extensions 130 can be used with a single valve box 100 until the desired height is achieved. The extension 130 may increase sidewall support.

Figure 11:
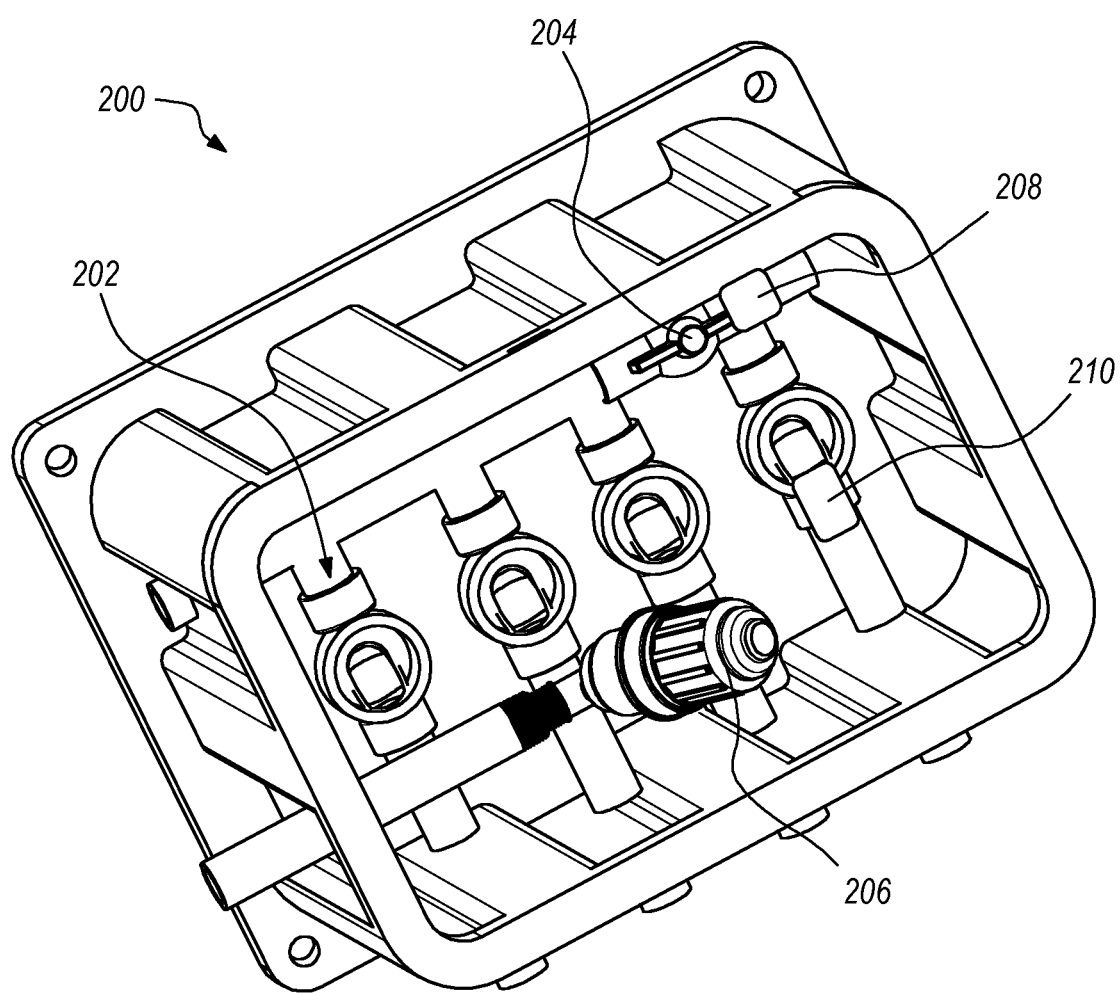
FIG. 11 illustrates a top perspective view of a sprinkler valve box.

In one embodiment, as shown in FIG. 11, a sprinkler valve box 200 comprises a pre-configured manifold 202, a shutoff valve 204, a filter 206, a battery 208, and a control unit 210, wherein the control unit 210 is powered by the battery 208 and controls the valves of the manifold 202. In one embodiment, the control unit 210 comprises a microcontroller and a wireless transceiver. The wireless transceiver may be any number of wireless protocols, such as Bluetooth®, Wi-Fi®, or other wireless protocols. In one embodiment, a user may control the manifold remotely via a wireless connection to the control unit. For example, the control unit may be connected to the user's home Wi-Fi. The user may then use a companion application on a smartphone to access the control unit settings and thereby adjust the control unit from anywhere with an internet connection. Further, if battery operated, the control unit could send a notification to a user when a low battery is detected, providing a user with sufficient notice to charge or replace the battery(ies). This wireless connectivity would reduce the need to run wires to the valve box 200 and would also allow a user to control their sprinkling system at any time from a smartphone or other internet-connected device.

Figure 12:
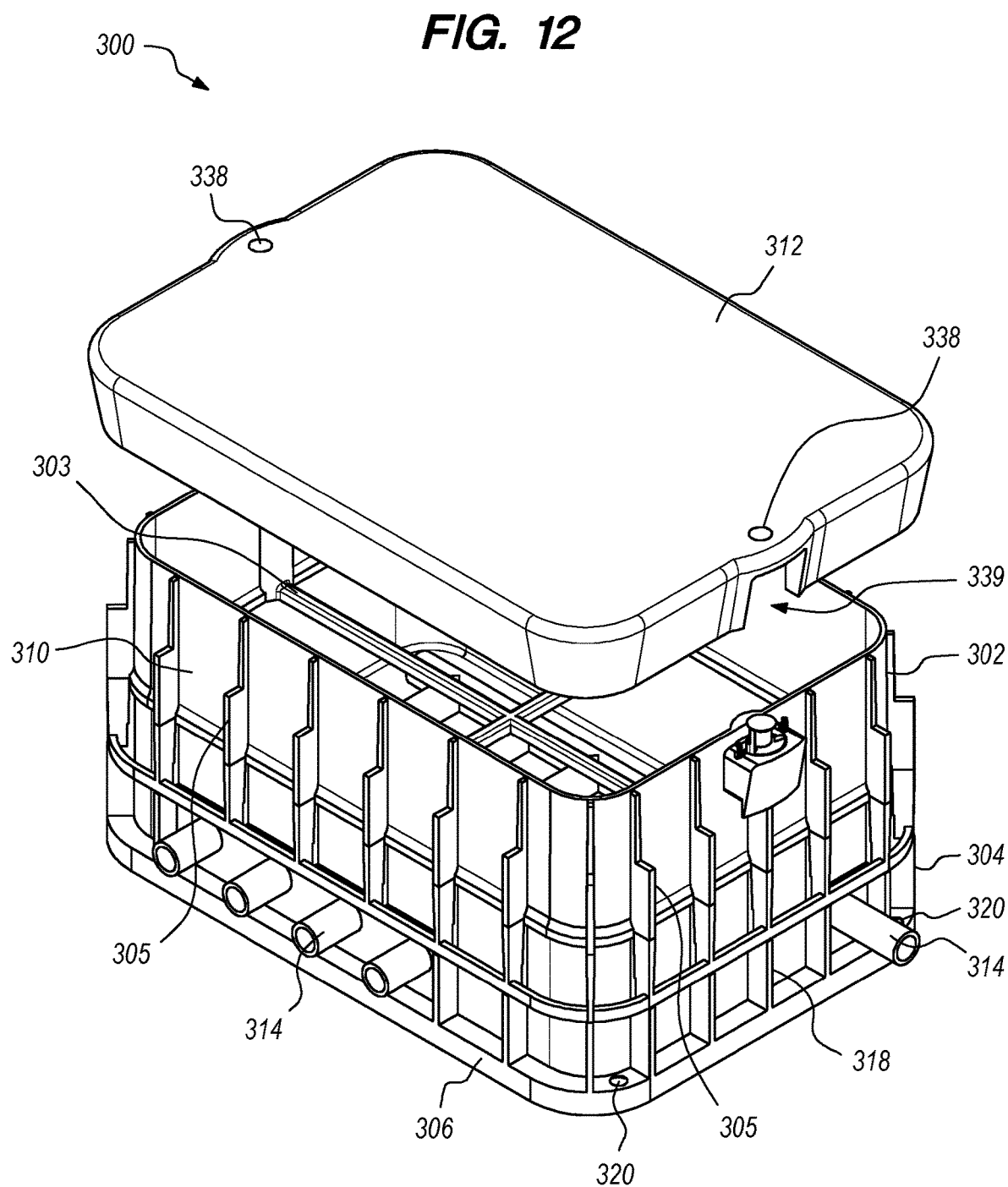
FIG. 12 illustrates a top perspective view of a sprinkler valve box.
Figure 13:
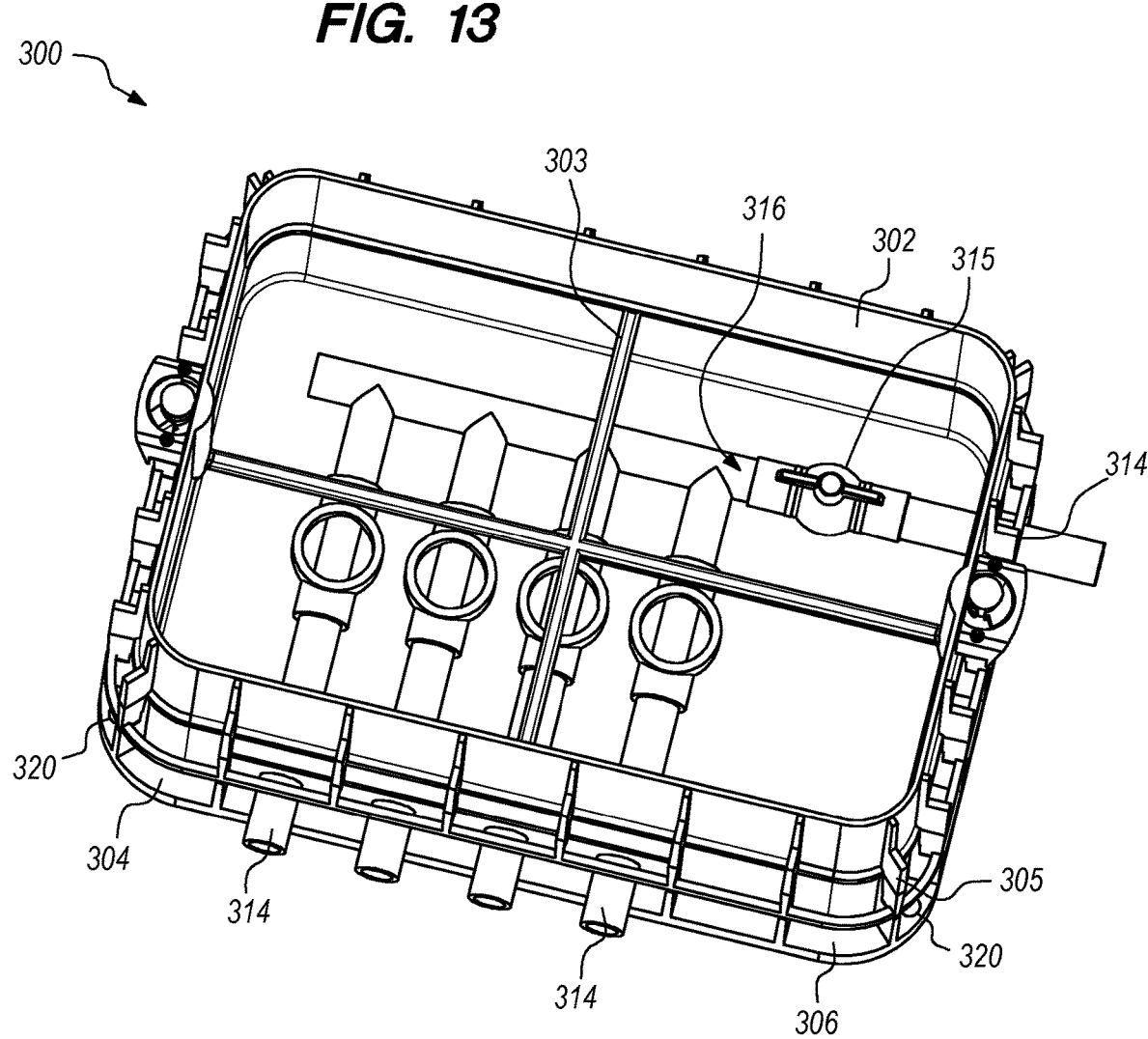
FIG. 13 illustrates a top perspective view of a sprinkler valve box with the lid removed.
Figure 14:
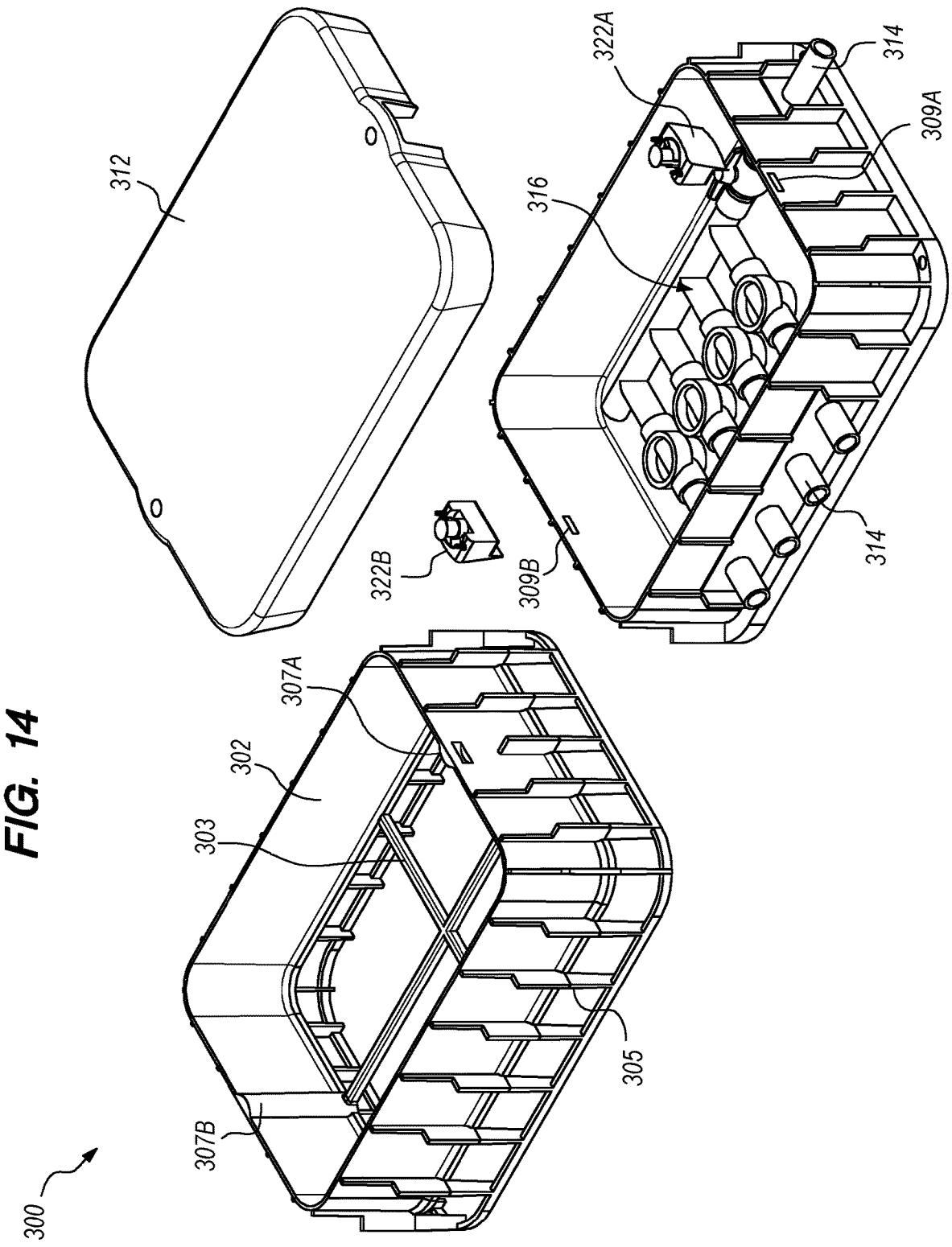
FIG. 14 illustrates an exploded view of a sprinkler valve box.

In one embodiment, as shown in FIGS. 12-14, a sprinkler valve box 300 comprises an extension 302 and a housing 304. The housing 304 having a base 306 and sidewalls 310 with a sealable lid 312 thereon, the sidewalls 310 having one or more connecting ports 314 therethrough. The extension 302 may comprise a crossbar 303 so as to increase support and prevent the extension 302 from caving in. Further, the extension may comprise extension ribs 305 that provide further structural integrity to the extension 302. The extension may further comprise extension locking channels 307A, 307B for connecting the lid 312 thereto. While an extension is shown, it will be appreciated that the housing 302 may directly receive the lid 312. The housing 304 may be fully molded so as to prevent any points of entry or leak. However, while the housing 304 shown may be molded, it will be appreciated that the housing may come in multiple connectable portions. The connecting ports 314 may function as inlets/outlets of water, allowing for easy connection. In other words, a user may simply connect one or more sprinkler lines to the outgoing connecting port(s) 314.

Referring to FIGS. 13-14, in one embodiment, the housing 304 comprises a shutoff valve 315 and one or more pre-configured valves 316 therein (collectively referred to as a manifold), the valves 316 coupled to the one or more connecting ports 314 in the sidewalls 310. It will be appreciated that the manifold may be unibody/monolithic. In addition, the sidewalls 310 may comprise locking channels 309A, 309B for securing the lid 312, and rib structures 318 for added strength, reducing torsion and sidewall deflection. If the connection ports 314 are coupled to the sidewalls 310 on an inner channel of the rib structures 318, the connection ports 314 are more protected, particularly when excavating around the valve box 300, which reduces odds of breakage at the connection point. In an alternate embodiment, the sidewalls 310 are flat, without rib structures 318. The rib structures 318 of the housing 304 may receive the extension ribs 305, being mated thereon. In other words, as a user slides the extension 302 onto the housing 304, cavities created be the extension ribs 305 may be positioned over the rib structures 318, creating a mated sprinkler valve box 300.

Because the housing 302 comprises the base 306, the odds of it settling deeper into the ground are reduced, while also reducing the pop-out effect when in a flooded environment. For example, the base 306 may be wider than the sidewalls 310, which maintains the valve box 300 in its position. Further, the base 306 may be solid, which allows the valve box 300 to have the contents therein sealed. However, in one embodiment, the base 306 need not be solid and may contain one or more apertures. This may be beneficial to allow leaking water to seep into the ground below, rather than raise up in the valve box 300 where it can affect wiring or other components. The base 306 may have spike apertures 320 that allow the valve box 300 to be secured to the ground, which further reduces or eliminates movement of the valve box 300 once placed.

Figure 15:
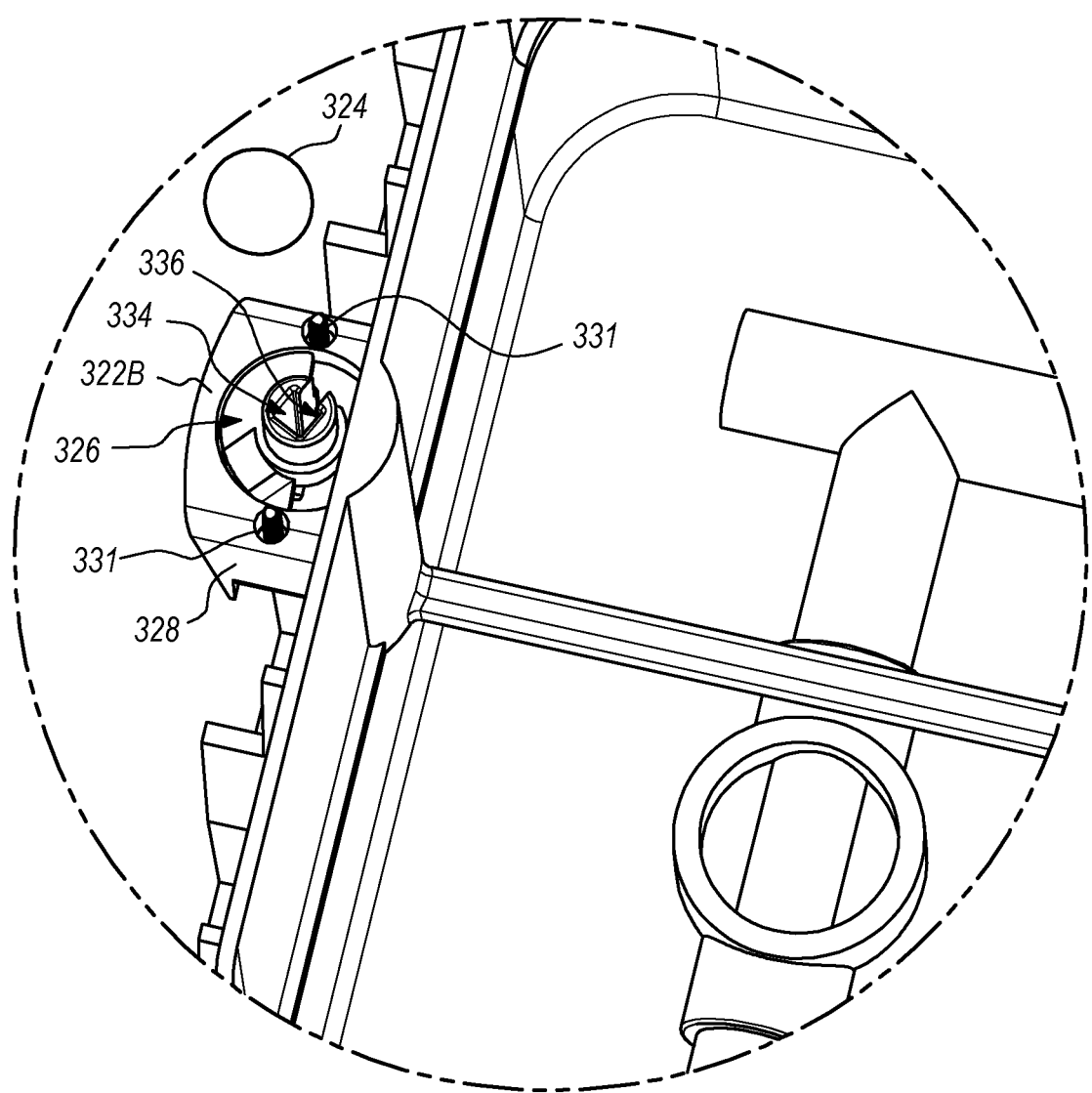
FIG. 15 illustrates a detailed view of a locking mechanism of a sprinkler valve box.
Figure 16:
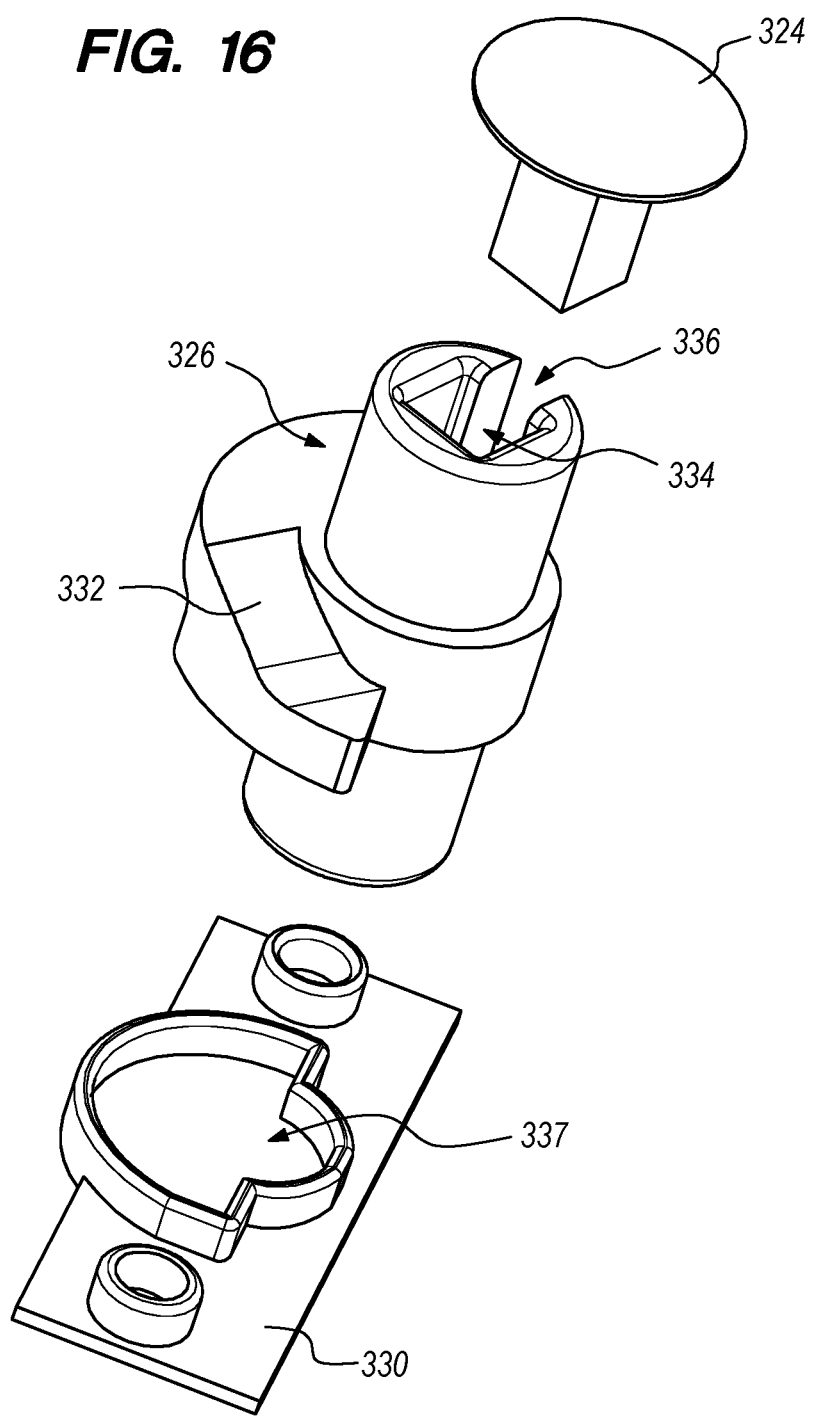
FIG. 16 illustrates an exploded view of a locking mechanism of sprinkler valve box.
Figure 17:
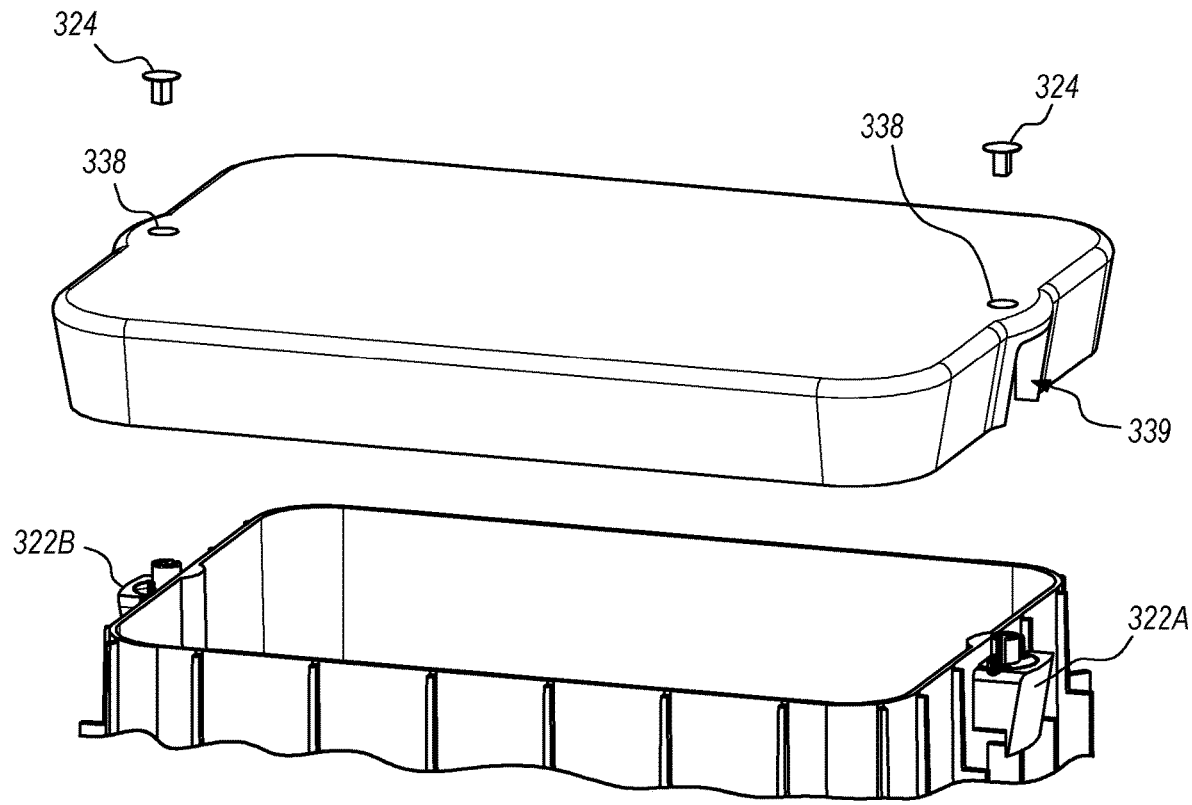
FIG. 17 illustrates a side, perspective view of a sprinkler valve box with the lid removed.

Referring to FIGS. 15-16, in addition, the housing 302 may further comprise locking mechanisms 322A, 322B (also shown in FIG. 14) that may be positioned into the locking channels 309A, 309B. The locking mechanism 322A, 322B may include a plug 324, a camlock portion 326, a cover 328, and a dust shield 330. The camlock portion 326 may comprise a camlock 332. The camlock portion 326 may further comprise a plug aperture 334 and a slot 336 so as to receive the plug 324. For example, the plug 324 may be inserted into a plug aperture 334 positioned on the camlock portion 326. It will be appreciated that the plug 324 may act as a key after being inserted into the plug aperture 334. Other keys may include, but are not limited to, J-shaped key, allen wrench, etc. In one example, the J-shaped key may be inserted into the plug aperture 334 and the slot 336 so that when the camlock portion 326 is turned to an unlocked position, the J-key not only unlocks but acts as a handle. More specifically, the hook portion of the J-key is positioned under the lid 312 when the camlock portion 326 is in an unlocked position, thereby acting as a handle to lift the lid 312. When the camlock portion 326 is locked, the J is removable from the plug aperture 334 and slot 336. The cover 328 and the dust shield 330 may protect the locking mechanism 322A, 322B from debris, insects, etc. The dust shield 330 may have a camlock aperture 337 so as to receive the camlock portion 326. Further, the dust shield 330 may be coupled to the locking mechanism 322A, 322B via a securement mechanism 331, such as screws, snaps, pins, etc. While the camlocks 332 are shown, it will be appreciated that any other suitable locking mechanism may be used, such as levers, spring-loaded pins, cotter pins, bolts, etc.

The lid 312, in some embodiments, may comprise a water-tight seal, such as by using a rubber seal (e.g., similar to the O-ring in FIG. 6). This seal keeps the contents of the valve box 300 free from dirt, debris, bugs, rodents, and other objects. It will also be appreciated that while an O-ring and a locking mechanism 322A, 322B are shown, the valve box 300 does not need to have an O-ring or a locking mechanism 322A, 322B. In one embodiment, the valve box 300 may comprise an O-ring without a locking mechanism 322A, 322B, or vice versa.

Further, the lid 312 may also comprise receiving channels 339 to receive the locking mechanisms 322A, 322B. The lid 312 may also comprise key apertures 338 therethrough. It will be appreciated that when the lid 312 is positioned on the sidewalls 310, the plugs 324 may be inserted into the key apertures 338 and, ultimately, into the plug apertures 334, thereby sealing the valve box 300.

To actuate the locking mechanism 322A, 322B, a user may insert a key into the key apertures 338 and into the plug apertures 334. The key apertures 338 may pass through the lid 312, from a top to a bottom of the lid 312. As the user inserts the key into the key apertures 338 and into camlock portion 326 via plug aperture 334, the user may turn the key to position the camlock portion 326 into the extension locking channels 307A, 307B or locking channels 309A, 309B so as to secure the lid 312 to the housing 304.

Further, the lid 312 may comprise a tapered edge. This allows the lid to be easily removed, aids in keeping debris away from the edge of the valve box 300 where the seal occurs, and allows for solid surface installation, such as in concrete or asphalt. Not only is removal of the lid 312 easier, but insertion of the lid 312 is easier with a tapered edge. While a tapered edge is shown, in some embodiments, the edge may be without a taper.

Accordingly, it will be appreciated from the foregoing that the valve box disclosed herein solves the need for a valve box that reduces or prohibits the ability of spiders, bugs, rodents, snakes and other creatures from inhabiting the box, that prohibits or prevents sinking, that is easy to assemble and install, and that allows a worker to quickly install the valves to the sprinkler lines, increasing efficiency.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A sprinkler valve box comprising:
   a housing comprising a base and sidewalls, the sidewalls comprising one or more locking channels and one or more locking mechanisms, wherein each locking mechanism is operably coupled to the one or more locking channels, and
   one or more connection ports, each connection port for an inlet or outlet of water;
   a lid positionable on, and able to be secured to, the housing, the lid comprising a rubber seal and securable to the housing via one or more key apertures configured to allow a key to pass through the lid for actuating the one or more locking mechanisms, the one or more locking mechanisms able to mate with the one or more locking channels of the sidewalls; and
   one or more pre-configured valves situated inside the housing
   wherein, when the one or more locking mechanisms are actuated in a first direction, the lid is securable to the housing and the rubber seal forms a water-tight seal on the housing.

2. The sprinkler valve box of claim 1, wherein the sidewalls comprise ribbed structures.

3. The sprinkler valve box of claim 1, wherein the base comprises spike apertures.

4. The sprinkler valve box of claim 1, wherein the lid comprises channels on an inner surface of the lid to receive the one or more locking mechanisms.

5. The sprinkler valve box of claim 1, wherein the one or more locking mechanisms comprise camlocks.

6. The sprinkler valve box of claim 1, wherein the lid comprises a tapered edge.

7. The sprinkler valve box of claim 1, further comprising a housing extension.

8. The sprinkler valve box of claim 7, wherein the extension comprises one or more locking channels and wherein the lid is able to form a water-tight seal with the extension.

9. The sprinkler valve box of claim 1, further comprising a battery for providing power to actuate the pre-configured valves.

10. The sprinkler valve box of claim 1, further comprising a control unit.

11. A sprinkler valve box comprising:
    a housing comprising a base and sidewalls, the sidewalls comprising:
    a first locking channel on a first side and a second locking channel on a second side,
    a first locking mechanism coupled to the first side and a second locking mechanism coupled to the second side, each locking mechanism operably coupled to the first locking channel and second locking channel, respectively,
    a plurality of connection ports, each connection port for an inlet/outlet of water, and a plurality of vertical rib structures to provide structural integrity to the sidewall s;

a lid positionable on, and able to be secured to, the housing, the lid comprising:

a tapered edge, a first key aperture on a first side of a top surface of the lid and a second key aperture on a second side of the top surface of the lid, each key aperture configured to allow a key to pass therethrough to a first receiving channel and a second receiving channel, respectively, each receiving channel receiving the first locking mechanism and the second locking mechanism, respectively, and each locking mechanism able to mate with the first locking channel and second locking channel of the sidewalls, and a rubber seal for sealing the lid to the sidewalls; and one or more pre-configured valves situated inside the housing and coupled to the plurality of connection ports;

wherein, when the first and second locking mechanisms are actuated in a first direction, the lid is securable to the housing and the rubber seal forms a water-tight seal on the housing.

12. The sprinkler valve box of claim 11, wherein at least one of the first and second locking mechanisms comprises a plug, a camlock portion, a cover, and a dust shield.

13. The sprinkler valve box of claim 12, wherein each camlock portion comprises a camlock.

14. The sprinkler valve box of claim 11, wherein the base comprises spike apertures.

15. The sprinkler valve box of claim 11, further comprising a housing extension.

16. The sprinkler valve box of claim 15, wherein the housing extension comprises a plurality of extension ribs.

17. The sprinkler valve box of claim 15, wherein the housing extension comprises a cross bar to provide structural integrity.

18. The sprinkler valve box of claim 15, wherein the extension comprises one or more locking channels and wherein the lid is able to form a water-tight seal with the extension.

* * * * *